United States Patent
Hong et al.

(10) Patent No.: US 7,672,757 B2
(45) Date of Patent: Mar. 2, 2010

(54) INTERFACE SYSTEM BETWEEN HUMAN AND CAR

(75) Inventors: Kwang-Seok Hong, Suwon-si (KR); Yong-Wan Roh, Seongnam-si (KR); Dong-Gyu Kim, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 252 days.

(21) Appl. No.: 11/772,465

(22) Filed: Jul. 2, 2007

(65) Prior Publication Data
US 2008/0140265 A1    Jun. 12, 2008

(30) Foreign Application Priority Data
Dec. 8, 2006    (KR) .................. 10-2006-0124875

(51) Int. Cl.
*G05D 1/00* (2006.01)
*G05D 3/00* (2006.01)

(52) U.S. Cl. ............... 701/2; 701/29; 701/36; 340/438; 340/439

(58) Field of Classification Search .......... 701/2, 701/33, 36, 29; 455/414.1, 423; 340/425.5, 340/438, 439, 426.1
See application file for complete search history.

(56) References Cited

U.S. PATENT DOCUMENTS

2005/0091327 A1* 4/2005 Koch .............. 709/206
2005/0130632 A1* 6/2005 Park .............. 455/414.1

FOREIGN PATENT DOCUMENTS

| JP | 2003-316385 | 11/2003 |
| JP | 2003-344140 | 12/2003 |
| JP | 2005-051490 | 2/2005 |
| JP | 2005-142642 | 6/2005 |
| KR | 10-2005-0122720 A | 12/2005 |

* cited by examiner

*Primary Examiner*—Gertrude Arthur Jeanglaud
(74) *Attorney, Agent, or Firm*—Morgan, Lewis & Bockius LLP (57) ABSTRACT

An interface system between a user and a vehicle includes a vehicle information terminal in communication with the vehicle; a VXML server that converts information into voice signals, and receives and transmits the voice signals between the vehicle information terminal and a telephone; an SMS server that converts information into a message, and transmits the message to the telephone; and a WIPI server that receives and transmits vehicle remote control information between the telephone and the vehicle information terminal.

5 Claims, 10 Drawing Sheets

FIG.4 operation of short message service system

| order | executed contents |
|---|---|
| ① | emergency(intrusion and damage) occurs in vehicle |
| ② | car sensor board system detects emergency |
| ③ | car sensor board system generates alarm signal and transmits alarm signal to car information terminal interface system |
| ④ | status information is transmitted from car information terminal interface system to VXML server system (vehicle information middleware) |
| ⑤ | VXML sever transmits SMS information to SMS hosting server by using SMS system |
| ⑥ | status of vehicle is alarmed to user |

FIG.5 contents transmitted to hosting provider
when transmitting short message

| Data Field | contents |
|---|---|
| tran_id | ID for using SMS (ID registered upon application) |
| tran_password | password for using SMS (password registered upon application) |
| tran_phone | cell phone number to which message is transmitted (receiver number) |
| tran_callback | cell phone number to which message was transmitted (transmitter number) |
| tran_date | message transmitting time (0 is sent in case of immediate transmission, YYYY-MM-DD HH:MM:SS is sent in case of transmission on schedule) |
| tran_msg | message to be transmitted (maximum length of message is 80 byte) |

INTERFACE SYSTEM BETWEEN HUMAN AND CAR

CROSS-REFERENCE TO RELATED APPLICATIONS

The present application is based on and claims priority from, Korean Application Serial Number 10-2006-0124875, filed on Dec. 8, 2006, the disclosure of which is hereby incorporated by reference herein in its entirety.

FIELD OF THE INVENTION

The present invention relates to an interface system between a human and a car using VXML, SMS, and WIPI technologies.

BACKGROUND OF THE INVENTION

A typical telematics service is directed to traffic information and life information. A call connection service allows a user to check and control status of the vehicle and other information.

For example, remote diagnosis, remote door opening, stolen vehicle tracking, checking a car's location, etc, are provided by a system that allows the user to check and control the status of the vehicle by contacting an agent at a call center.

In a vehicle remote control system, the user transmits various kinds of control signals by a mobile terminal to remotely control the vehicle, and various alarm signals are transmitted to the user's mobile terminal.

That is, the vehicle remote control system transmits vehicle function control signals in message format by using a mobile communication network. In order to receive the various kinds of alarm signals from the vehicle, a number of transceivers, each for a specific kind of data, are provided.

Further, the vehicle remote control system is connected to the mobile terminal in which various function data of the vehicle are stored, and to an electric control unit that interfaces control data transmitted from the mobile terminal.

Moreover, one of the data transceivers has a communication module for transmitting the alarm signals from the electric control unit to the mobile terminal. Various data relay servers are provided between the mobile terminal and the transceiver. Therefore, the vehicle remote control system can easily control various functions of the vehicle remotely regardless of the distance.

However, the call connection service has drawbacks in that since it uses agents, service costs are high, and the database is manually managed. Further, the transceiver needs to be attached to a cellular phone.

SUMMARY OF THE INVENTION

An interface system between a user and a vehicle includes a vehicle information terminal in communication with the vehicle; a VXML server that converts information into voice signals, and receives and transmits the voice signals between the vehicle information terminal and a telephone; an SMS server that converts information into a message, and transmits the message to the telephone, and a WIPI server that receives and transmits vehicle remote control information between the telephone and the vehicle information terminal.

The system may also include a DB server that stores and manages the vehicle information and user authentication information. The vehicle information terminal may perform two way communication with the VXML server, the SMS server, and the WIPI server through the internet. The vehicle information terminal may be in communication with a vehicle sensor board that receives signals from sensors of the vehicle.

The VXML server may provide a vehicle-related information checking function, a vehicle remote control function, and/or an agent contact function. The WIPI server may provide a vehicle information providing function, a vehicle remote control function, and/or an agent contact function.

BRIEF DESCRIPTION OF THE DRAWINGS

For a better understanding of the nature and objects of the present invention, reference should be made to the following detailed description with the accompanying drawings in which.

DETAILED DESCRIPTION OF THE PREFERRED EMBODIMENTS

Figure 1:
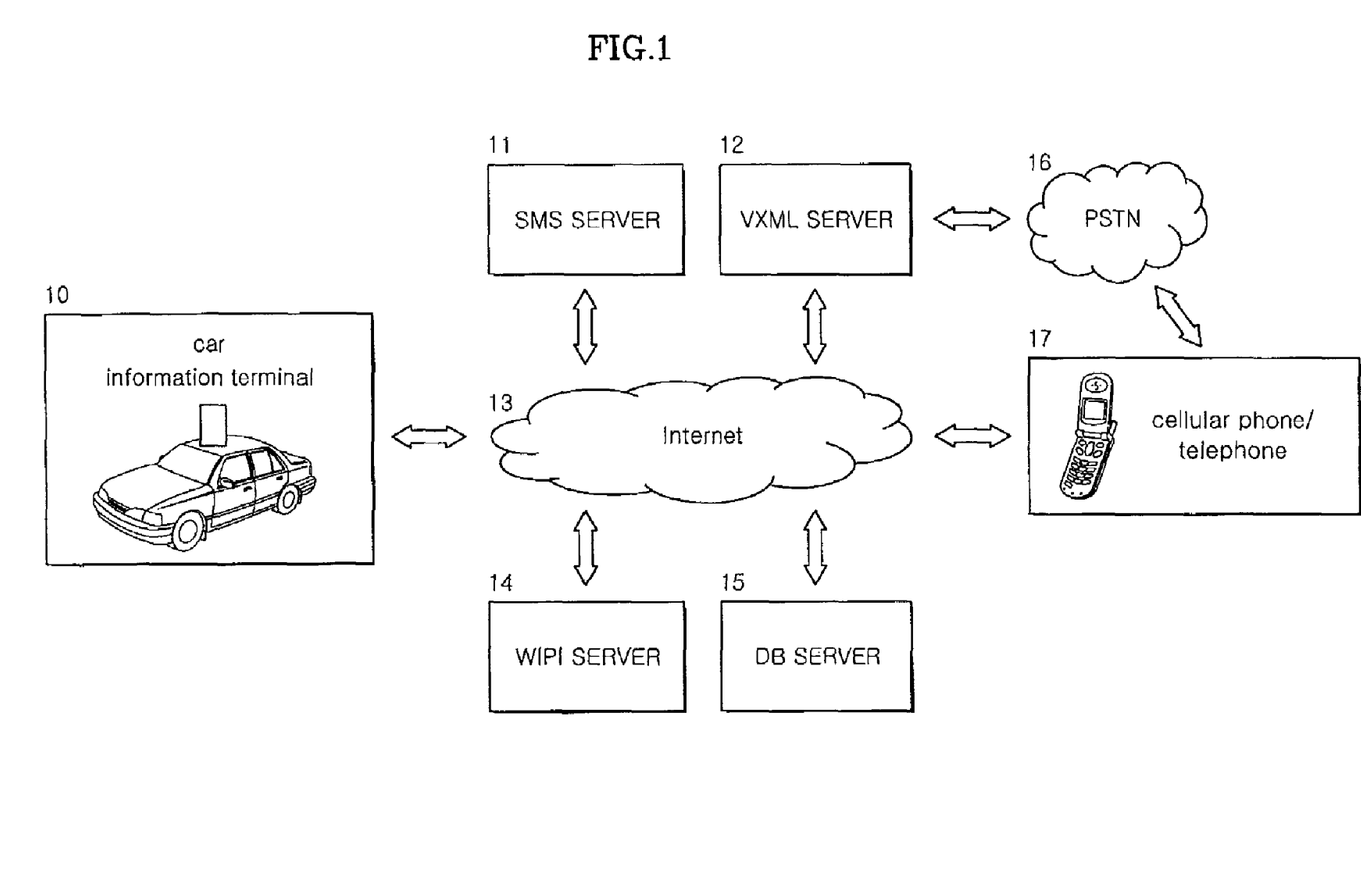
FIG. 1 illustrates an interface system between a human and a car according to an embodiment of the present invention.

As shown in FIG. 1, an interface system between a human and a car according to am embodiment of the present invention includes a car information terminal 10, a short message service (SMS) server 11, a voice XML (VXML) server 12, an Internet 13, a wireless internet platform for interoperability (WIPI) server 14, a database (DB) server 15, a public switched telephone network (PSTN) 16, and a telephone 17. The interface system provides an interface between the human and the car using VXML and without contacting an agent. VXML server 12 performs voice recognition on a request input by a telephone user, and information from the vehicle is verbally transmitted to the user by speech synthesis.

The present invention saves time by allowing the user to be informed of a status of the vehicle, even when it is parked remotely, by telephone. Further, the technique immediately informs the user if the vehicle is damaged or broken into, such that the user can immediately address the situation.

Further, the technique provides a convenient way for the user of the car to use vehicle information and services and secures the interface technique between the car information terminal and the telephone user by the VXML. Moreover, the technique allows operation of vehicle control by using WIPI technology.

The owner of the vehicle can check the status of their car or issue a control command by using the telephone. For example, for information that is provided from a sense board in the car, communication is performed between the car information terminal and the VXML server through the Internet.

Meanwhile, when vehicle information is transmitted to VXML server 12 from a vehicle information terminal 10, vehicle information middleware of the VXML server stores the vehicle information in the user DB, and verbally informs the vehicle owner of the vehicle information via his/her telephone by using a VXML interpreter.

If a vehicle emergency, such as theft, damage, crash, etc. occurs, the vehicle owner is informed of the emergency by an SMS text message. Further, on the basis of the WIPI technology, the owner can use his/her cellular phone as a car key.

For example, when a WIPI program is executed in the cellular phone of the vehicle owner, and the user issues a command, the WIPI server receives the command and stores the command in the DB. The vehicle information middleware reads the stored command and transmits the command to the vehicle information terminal in the car. Then, the vehicle information terminal transmits the command to the senseboard to execute operations such as starting the engine, door opening, and the like.

The execution results are transmitted from the senseboard to the vehicle information terminal, which transmits the vehicle information to the WIPI server. Further, the vehicle information middleware stores the vehicle information in the user DB, and a WIPI server program informs the vehicle owner of the execution results.

An interconnection between the VXML technology and the vehicle information terminal transmits verbal commands to the vehicle via the owner's telephone, and transmits vehicle information to the telephone speech synthesis. For example the technique can be divided into a VXML server, an SMS server, a WIPI sever system, a vehicle information terminal system, a vehicle information middleware system and a vehicle sensor board system.

The main functions of the VXML server system are a vehicle information checking function, a vehicle remote control function, a remote control function, and an agent contact function. The main function of the SMS server system is informing the cellular phone of an emergency if the parked vehicle is crashed, broken into, or the like. The WIPI server system controls the start up of the vehicle, opening doors, and the like by using wireless Internet of the cellular phone.

The main function of the vehicle information terminal system is interconnection between the sensor board and the vehicle information terminal. Data is transmitted by using the sensor board and serial Bluetooth. The interconnection between the vehicle information terminal and the vehicle information middleware of the VXML server/SMS server/WIPI server is established through the Internet, and 128-bit data transmission is performed.

For the interconnection between the vehicle information terminal and the VXML server/SMS server/WIPI server the vehicle information middleware updates the information in the user DB. For data transmission to the vehicle information terminal from the VXML server/SMS server/WIPI server, the vehicle information middleware reads the contents of the DB and makes a request for information to the vehicle information terminal.

Further, the vehicle sensor board is manufactured to function as actual interface S/W. Sensor input function of the vehicle sensor board is replaced with S/W and the vehicle sensor board is also manufactured to perform output functions, such as car door control, car start-up and the like. The sensor board communicates with the vehicle information terminal using the serial Bluetooth with a baud rate of 19,200 bps.

Figure 2:
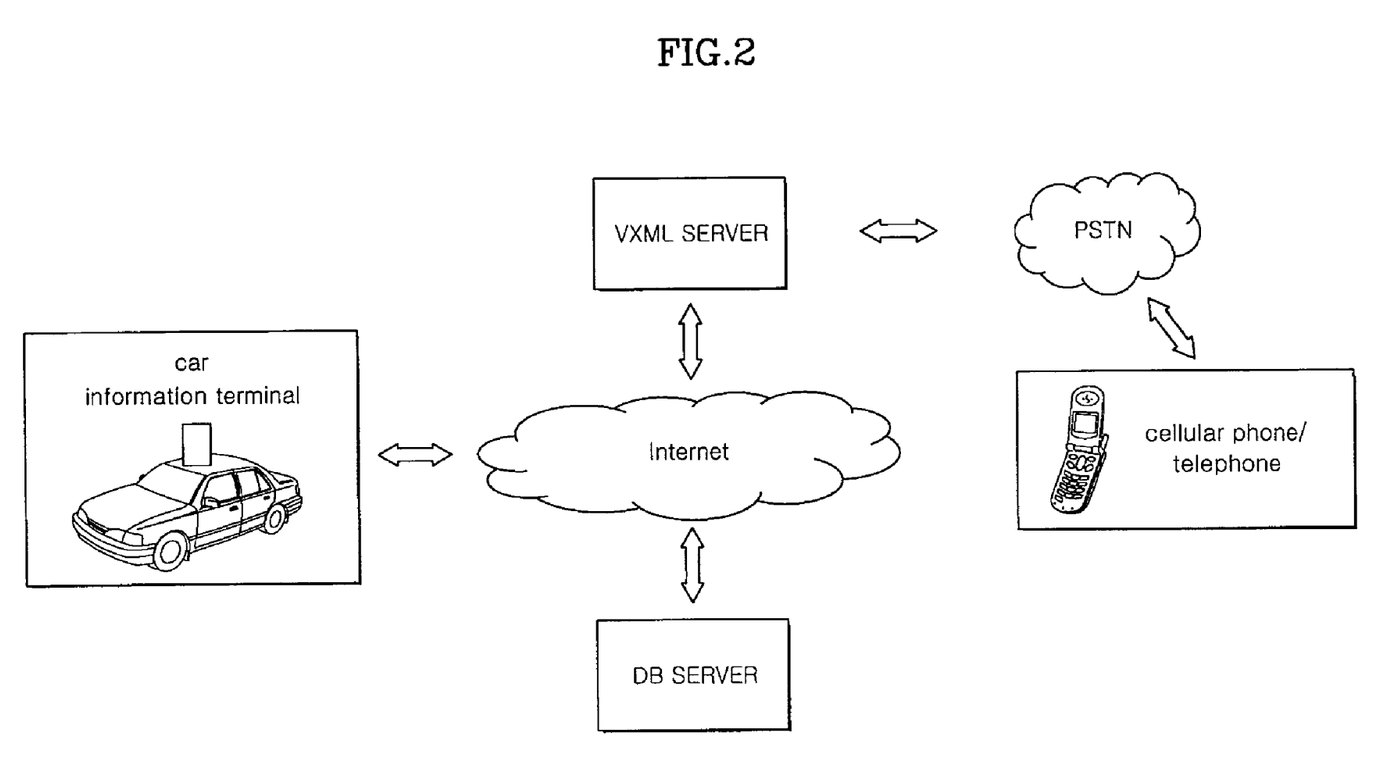
FIG. 2 illustrates a configuration of a VXML server system according to an embodiment of the present invention.

The VXML server system according to an embodiment of the present invention will now be described with reference to FIG. 2. When the user makes a call to a Voice XML server the Voice XML server first provides an audio announcement to the user and then performs user authentication. The user authentication may include call number authentication; checking a user identification number of seven characters, and a user password of four characters that are given to each user; or recognizing the name of the vehicle owner that is input verbally.

After the user authentication, vehicle information, vehicle remote control agent contact menu, and the like are provided. When vehicle information is selected, the user makes a selection from a vehicle information menu. The vehicle information menu may include operation/non-operation of an alarm system, start-up status, door status, light status, intrusion information, damage information, previous menu, and the like. For example, when the user selects door status information on whether the door is locked or unlocked is transmitted from the vehicle to the vehicle information terminal. Then, when the information is input to the DB from the vehicle information terminal, the information on the door status is read from the DB and verbally provided to the user.

When selecting the vehicle remote control, the user makes a selection from vehicle remote control menu. The vehicle remote control menu may includes door status, start-tip status, alarm system control, and the like. For example, when the user voices a command of "alarm system", the command that operates the alarm system is transmitted to the vehicle. When the instruction is completed in the vehicle, information on the alarm system status is read from the DB, and verbally provided to the user.

Figure 3:
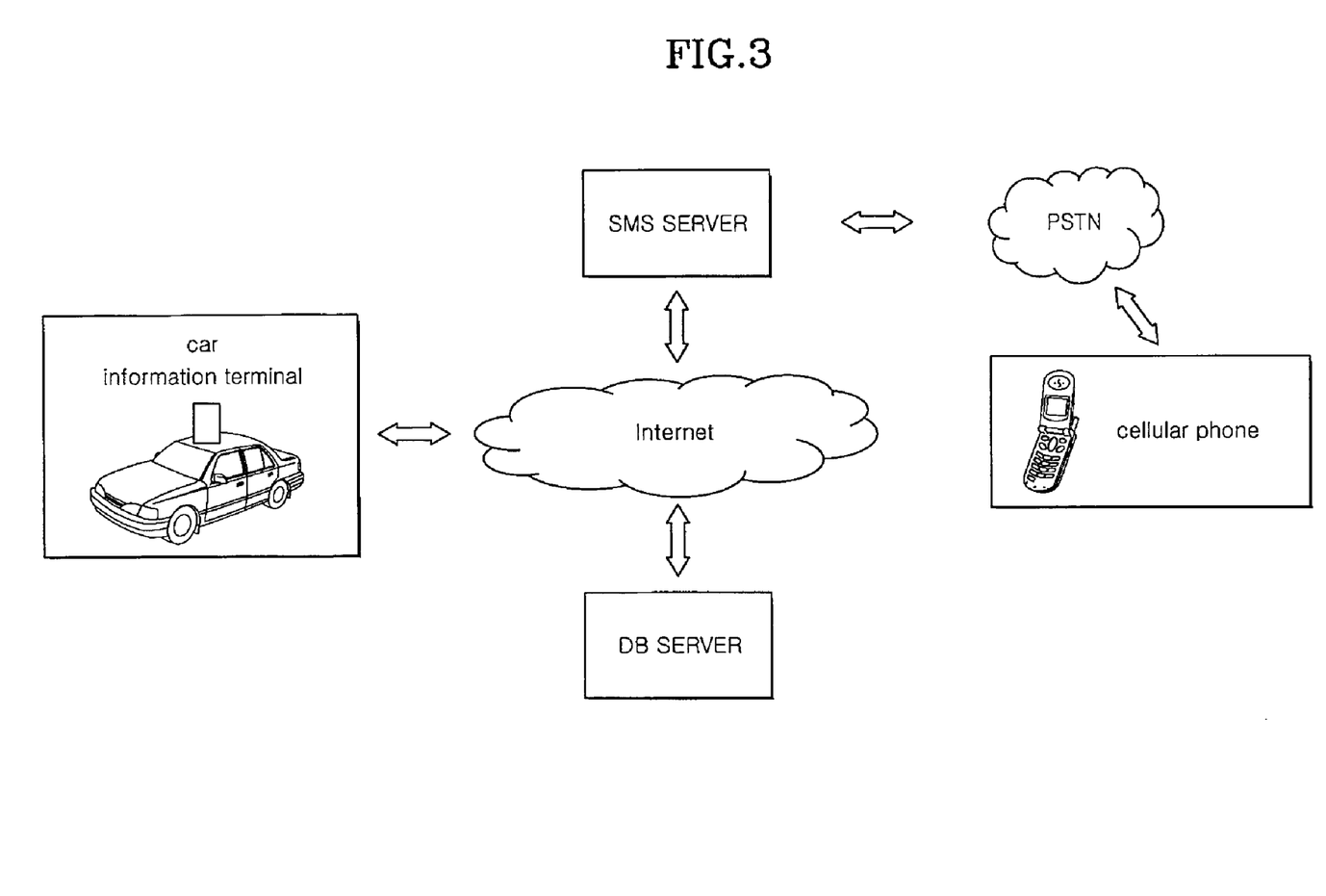
FIG. 3 illustrates an SMS server system according to an embodiment of the present invention.
Figure 4:
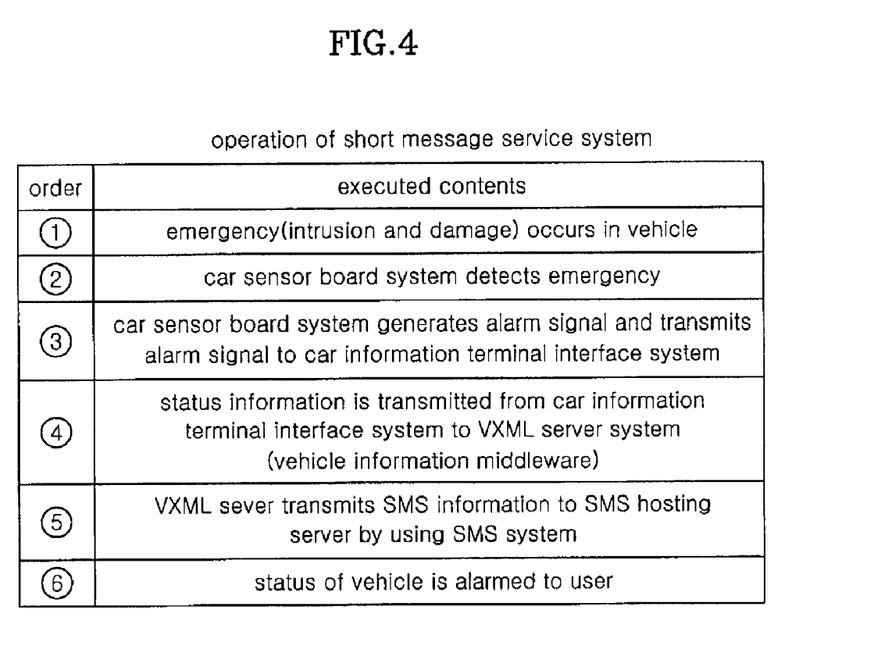
FIG. 4 is a flowchart illustrating the operation of an SMS server system according to an embodiment of the present invention.

The SMS server system according to an embodiment of the present invention will now be described with reference to FIG. 3. First, when an emergency occurs to the vehicle, for example, intrusion, damage, and the like, the vehicle owner is informed of the emergency, such as with the short message service system that uses SMS hosting as shown in FIG. 4.

For example, the SMS server checks a packet that is transmitted from the vehicle. When there is information on damage or intrusion, the SMS server searches the user database and recognizes information on the user's cellular phone and sends an SMS message. An SMS client exists as an independent program.

Figure 5:
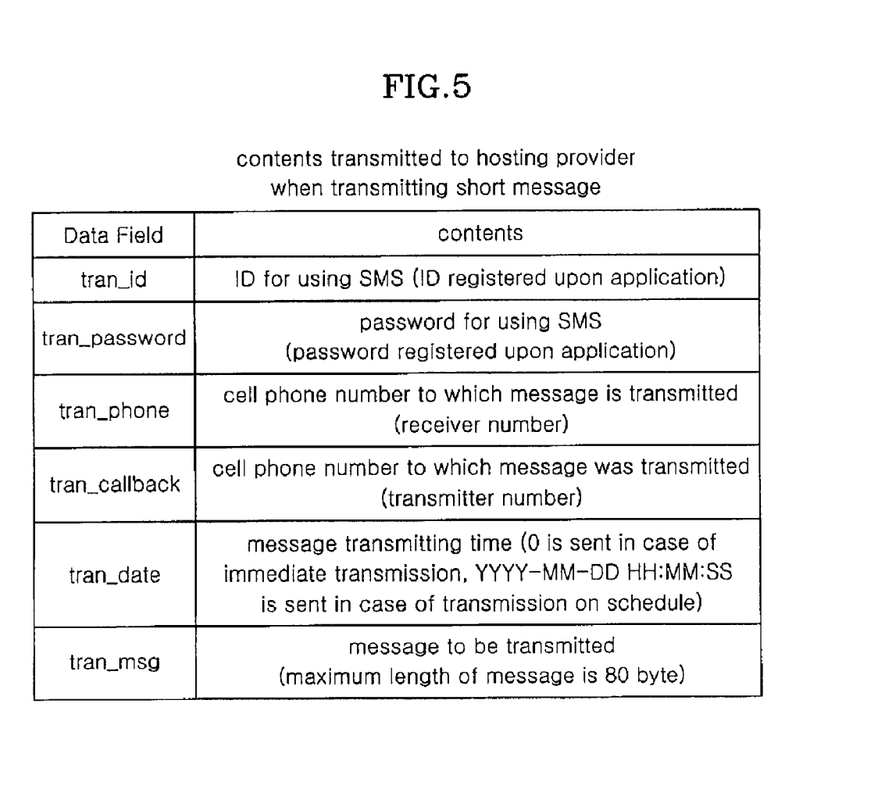
FIG. 5 illustrates contents transmitted from an SMS server system according to an embodiment of the present invention.

An SMS hosting service, and an SMS client module, that may operate in UNIX environment using C language, such as those provided by Gabia Inc. may be used. When an SMS transmission request is made to the SMS hosting server, information, such as that shown in FIG. 5, may be included.

Figure 6:
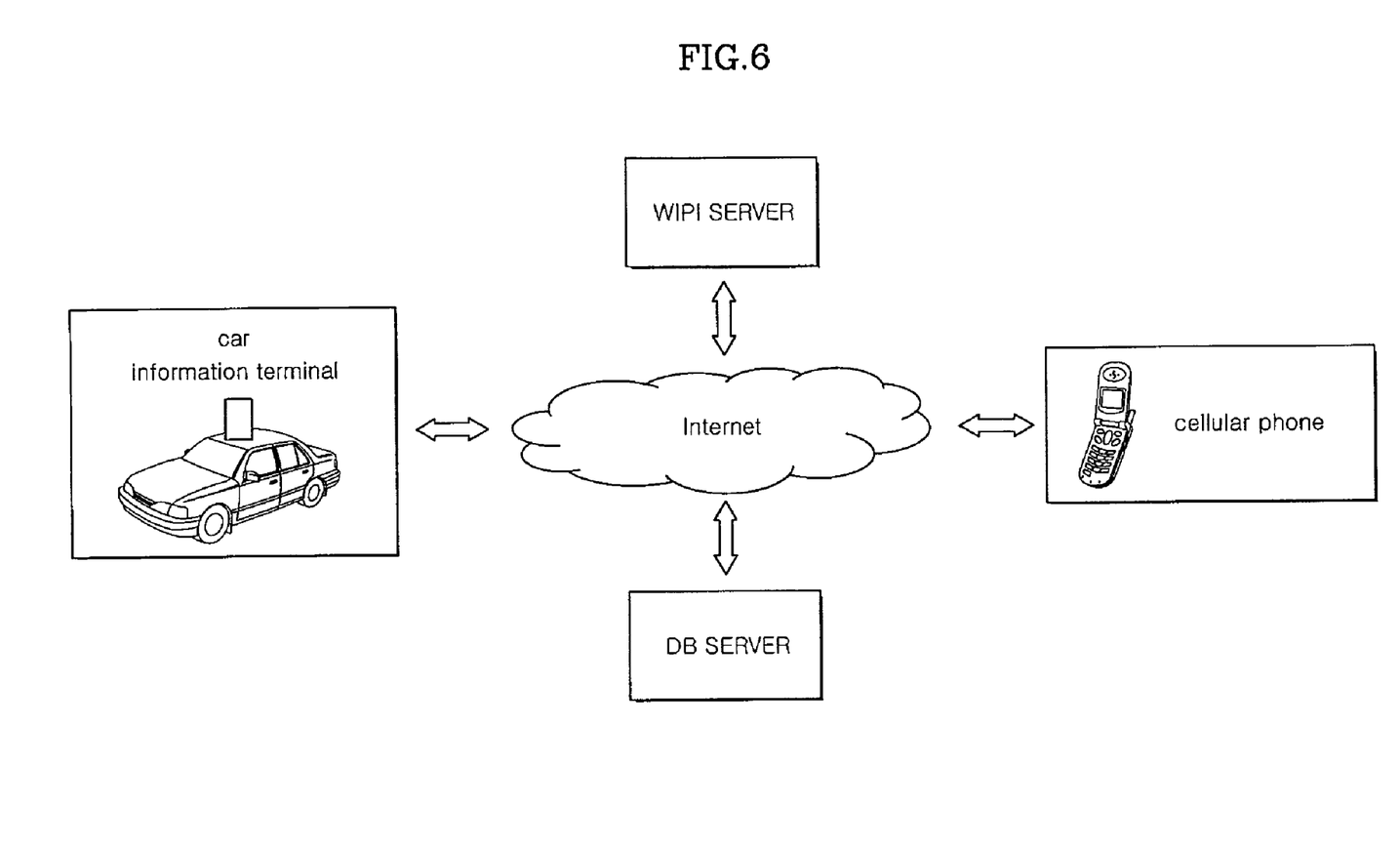
FIG. 6 illustrates a structure of a WIPI server system according to an embodiment of the present invention.

The WIPI server system according to an embodiment of the present invention will now be described with reference to FIG. 6. First, when the user is connected to the WIPI server, the WIPI server automatically executes user authentication, and provides vehicle information of the vehicle information system, vehicle remote control, agent contact menu and the like.

Then, to select vehicle information, the user makes a selection from the vehicle information menu. The vehicle information menu includes operation/non-operation of the alarm system, start-up status, door status, light status, intrusion information, damage information, previous menu, and the like.

For example, if the user selects door status, information on whether the door is locked or unlocked is transmitted from the vehicle to the vehicle information terminal. Then, when the information is input to the DB from the vehicle information terminal, the information on the door status is read from the DB and provided, such as verbally, to the user.

Further, to select vehicle remote control, the user makes a selection from the vehicle remote control menu. The vehicle remote control menu includes door status, start-up status, alarm system control, and the like. For example, if the user wants to control the alarm system, the command that operates the alarm system is transmitted to the vehicle. When the command is completed in the vehicle, information on the alarm system status is read from the DB, and is transmitted to the user, for example by being displayed on his/her cellular phone.

Figure 7:
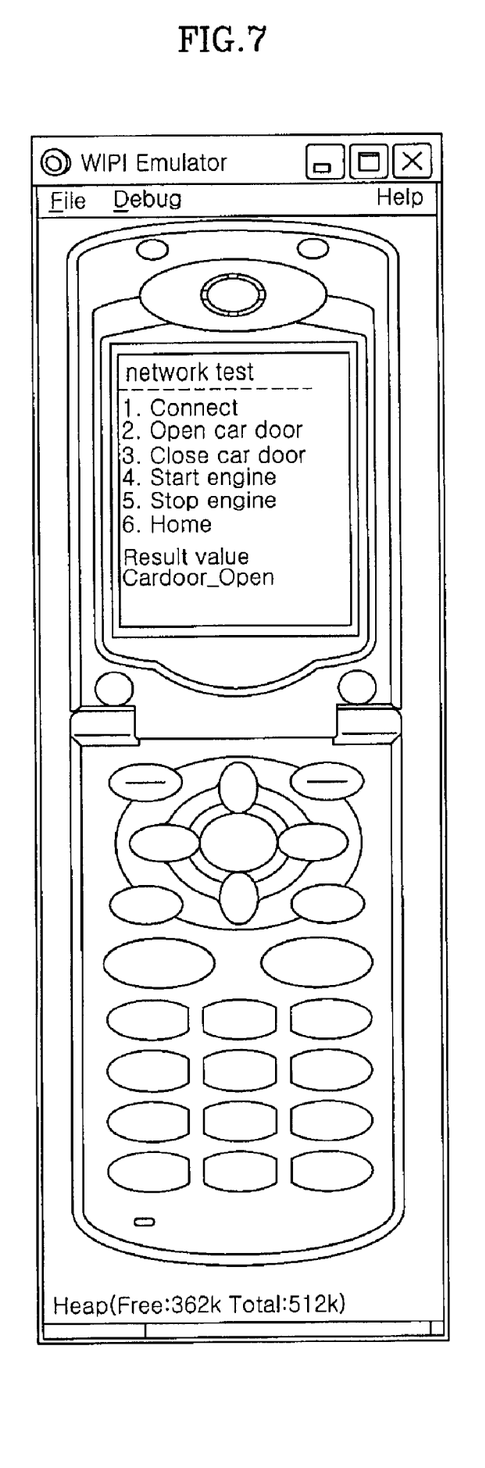
FIG. 7 is a front view of a screen of an exemplary WIPI emulator.

A cellular phone interface system serves as a gateway that connects the server and the vehicle sensor board system. That is, communication is performed through the Internet in the server/client format. The communication is performed on the basis of the vehicle sensor board and the WIPI. An exemplary screen on which a WIPI client is driven is shown in FIG. 7. The communication may use the cellular phone and the server that are based on WIPI.

Figure 8:
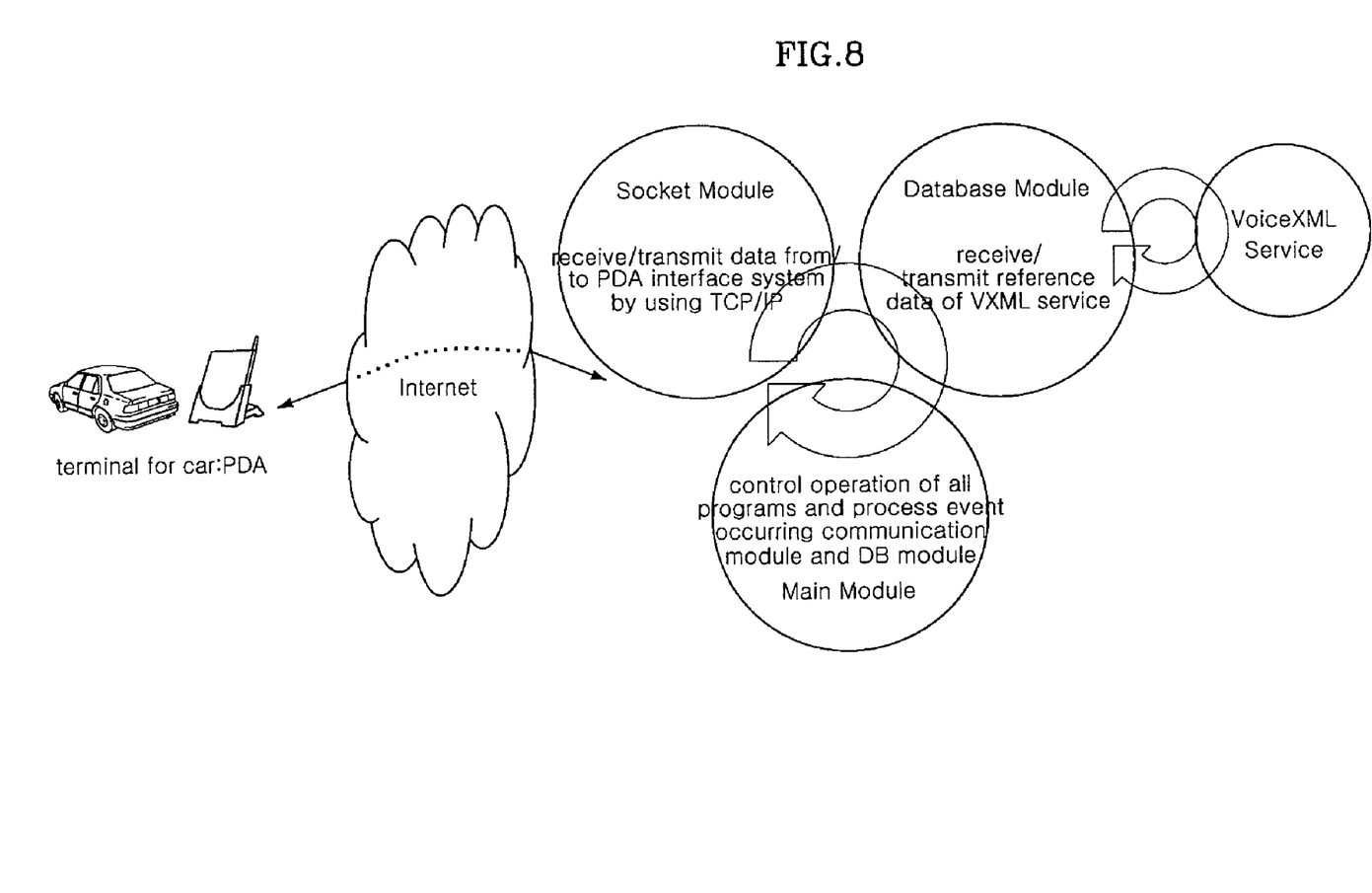
FIG. 8 illustrates a VXML module of a car information interface system according to an embodiment of the present invention.

The vehicle information middleware system according to an embodiment of the present invention will now be described with reference to FIG. 8. The vehicle information middleware may operate in the VXML server, and provides communication between different types of servers, such as the VXML server, the SMS server, the WIPI server, and the vehicle information terminal interface system. That is the vehicle information middleware is software that connects the VXML server and the vehicle information terminal interface.

Functions of the modules shown in FIG. 8 will now be described in detail. A socket module performs TCP/IP communication (reception and transmission) between the vehicle information terminal interface system and the vehicle information middleware. A database module receives/transmits reference database (Microsoft Access) of the VXML service, related information, such as the vehicle information and user's input. A main module controls the operation of all programs, processes events occurring in a communication module and a DB module, and processes emergency information.

On the basis of the detailed functions of the various modules, the vehicle information middleware functions as follows. First, the vehicle information middleware is interconnected with the vehicle information terminal interface system through the Internet and processes data transmitted from the vehicle information terminal interface system.

Further, the vehicle information middleware is interconnected with the reference database of the VXML service checks a command input by the user through the VXML service and transmits and processes the command to the vehicle information terminal interface system. Moreover, the vehicle information middleware is interconnected with the SMS system. When a vehicle emergency occurs the vehicle information middleware checks user information, and informs the user of the emergency.

For exemplary purposes only, implementing environment and system environment of the vehicle information middleware are as follows.

Figure 9:
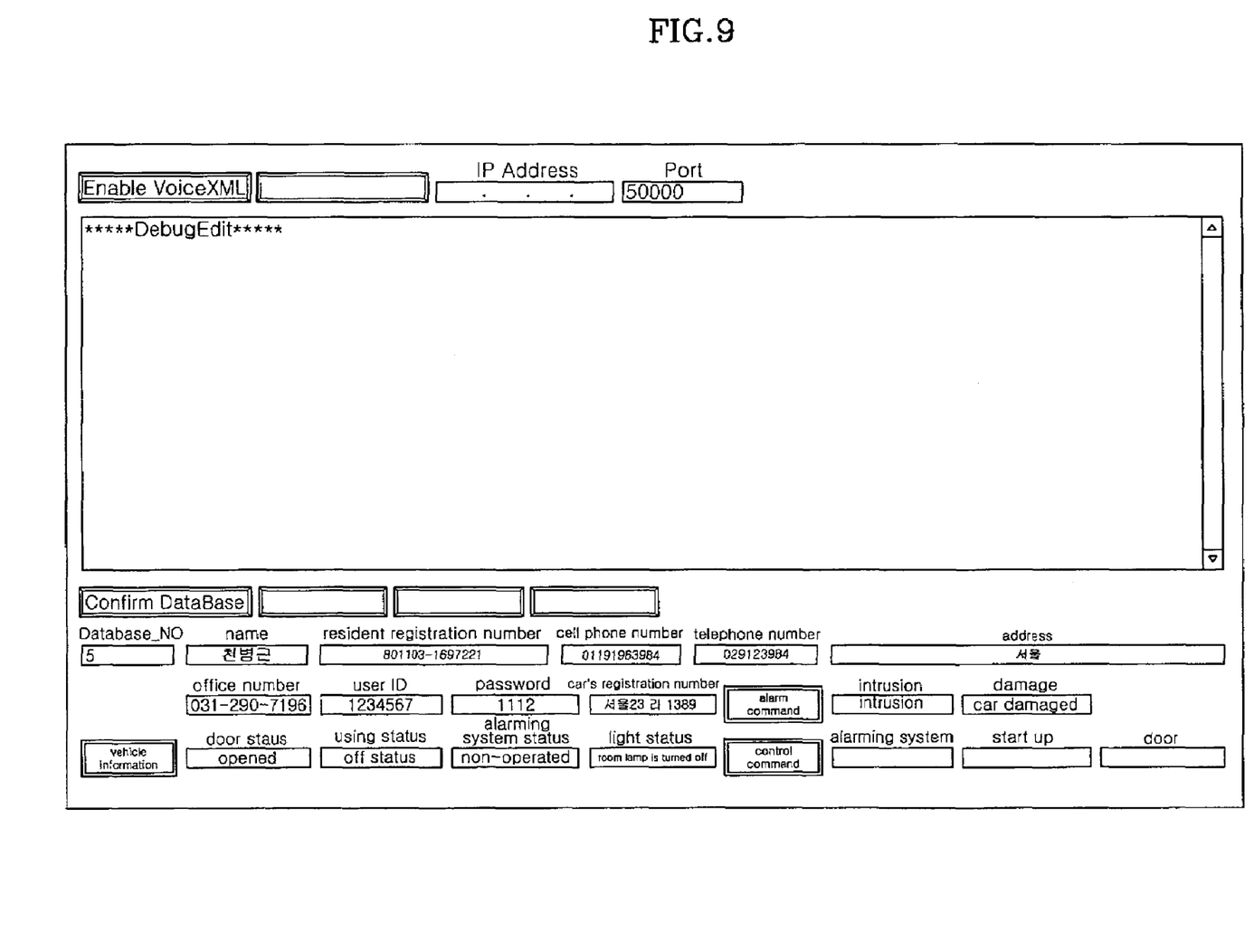
FIG. 9 is a front view of a screen of car information middleware according to an embodiment of the present invention.

The system environment may include a Dell Precision Workstation (CPU: Xeon 2.4 G and memory: 1 GB), and the implementing environment may include Windows 2000 Professional, Microsoft Access, and/or Microsoft Visual C++ 6.0. As shown in FIG. 9, a vehicle middleware screen is provided.

Figure 10:
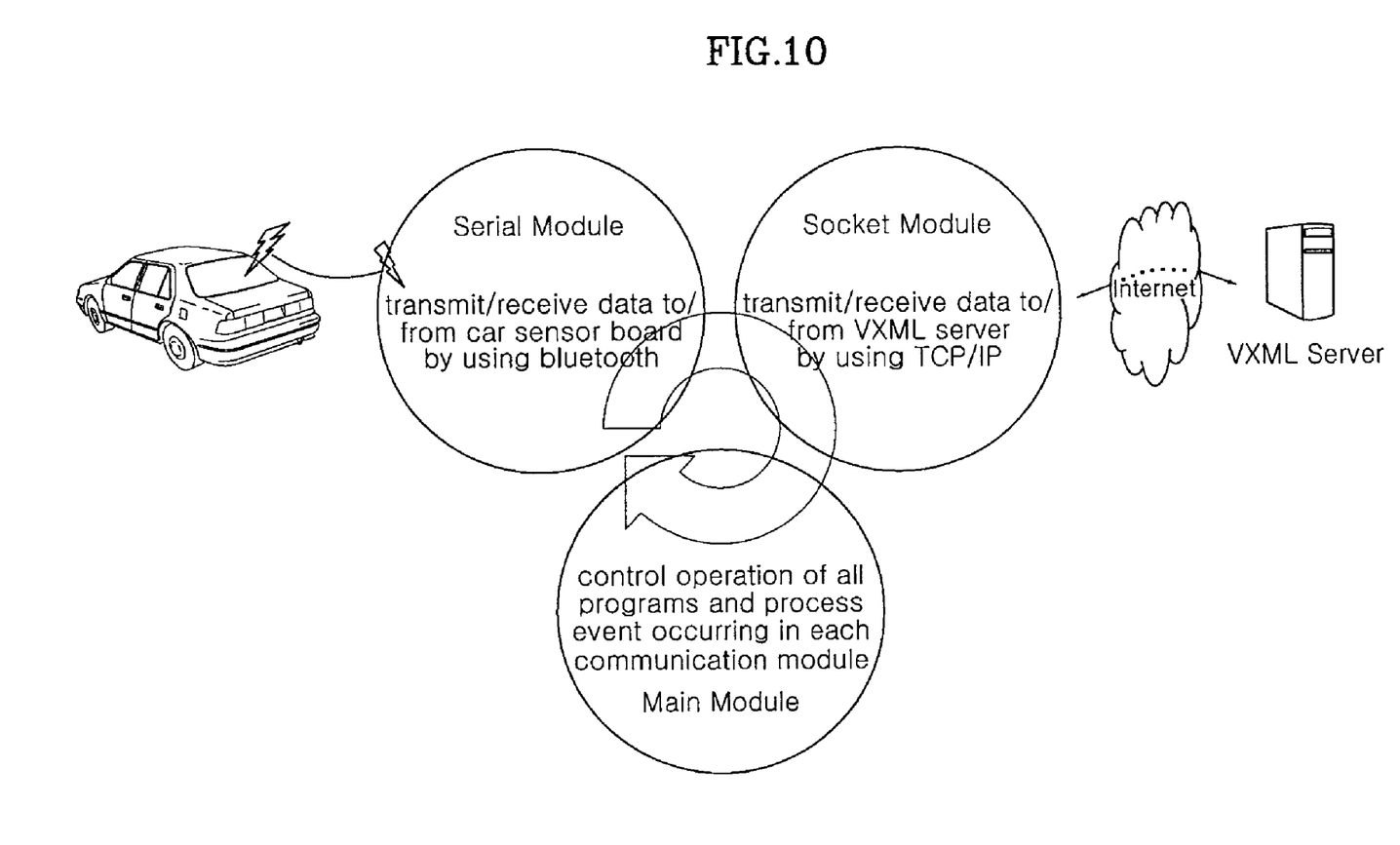
FIG. 10 illustrates a VXML module of a car information terminal interface system according to an embodiment of the present invention.

Hereinafter, the vehicle information middleware system according to an embodiment of the present invention will be described with reference to FIG. 10. The vehicle information terminal interface system serves as the gateway that connects the VXML server, the SMS server, the WIPI server, and the vehicle sensor board system. That is, the vehicle information terminal interface system communicates with the VXML server through the Internet in the server/client format and the vehicle information terminal interface system communicates with the vehicle sensor board on the basis of Bluetooth serial profile.

Meanwhile, according to a Bluetooth wireless communication method, an ISM frequency of 2.46 Hz is used, and a frequency hopping spread spectrum technique is used, such that 79 channels, each 1 MHz wide, are used and the channels may be switched 1600 times per second. Channel switching at a high rate prevents interference with other wireless communications.

Functions of modules shown in FIG. 10 will now be described in detail. First, a serial module communicates with the vehicle sensor board by using a virtual serial port that is generated when the vehicle sensor board and a PDA are connected through a Bluetooth communication channel (a Bluetooth serial profile is applied).

Meanwhile, a socket module performs TCP/IP communication with the VXML server. A main module controls the operation of all programs and processes events occurring in each communication module. On the basis of the detailed functions of the modules the vehicle information terminal interface system functions as follows.

First, the vehicle information terminal interface system is interconnected with the VXML server through the Internet, and processes all data that is transmitted from the VXML server. The vehicle information terminal interface system is interconnected with the vehicle sensor board through Bluetooth. Further, the vehicle information terminal interface system receives and converts information on the vehicle through the vehicle sensor board, and transmits the converted information to the VXML server. Moreover, the vehicle information terminal interface provides the information which is transmitted from the vehicle sensor board, to the user, such as through an LCD of the vehicle information terminal.

Further, the interface system stores user's information (e.g., user ID, password, vehicle's registration number, etc), and thus allows the service to operate without the user performing additional procedures.

Figure 11:
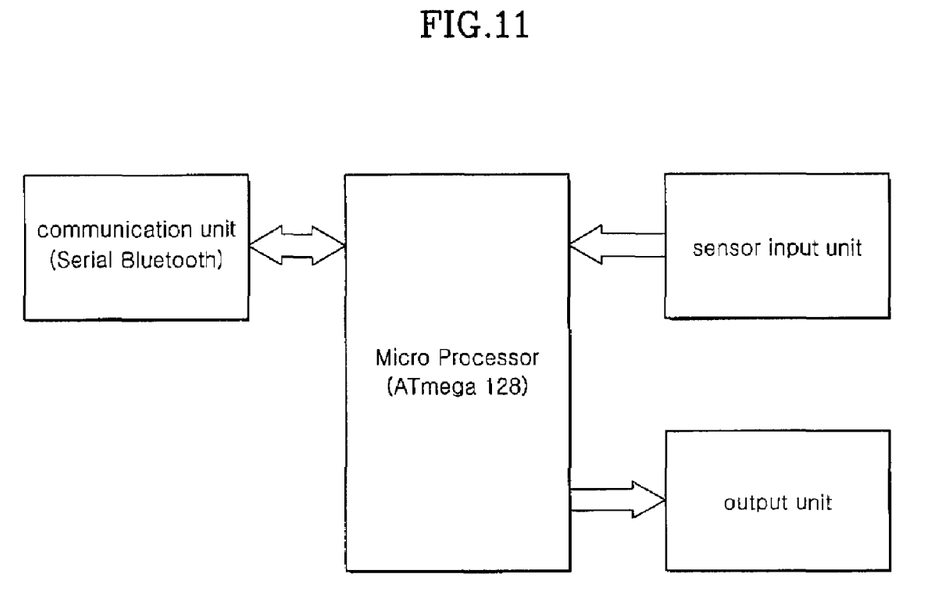
FIG. 11 illustrates a car sensor board according to an embodiment of the present invention.

Hereinafter, the vehicle information middleware system according to an embodiment of the present invention will be described with reference to FIG. 11.

The vehicle sensor board receives signals, which are transmitted from various sensors of the vehicle by a microprocessor, determines whether the vehicle has problems or not, and transmits the determination result to the vehicle information terminal.

Further, the vehicle information middleware system receives and executes a vehicle control command from the vehicle information terminal. For example, a power supply unit receives power from a battery, converts the power into power necessary for the entire circuit, and supplies the converted power. A communication unit interfaces the processor and a Bluetooth communication module. A sense input unit replaces the various sensors of the vehicle with the S/W.

Further, an output unit displays a result after the vehicle control command is executed. The microprocessor may be a CPU of the vehicle sensor board that uses, for example, ATmega 128.

As apparent from the forgoing, when the human and the car are interfaced using the VXML, the status of the vehicle is checked and controlled by the user who uses the telephone. In a case of the status checking, when the user makes a call, the WIPI server interfaces with the vehicle information terminal, and the vehicle sensor board returns the current status. Then, the current status is transmitted to the VXML server from the vehicle information terminal. Therefore, the current status can be verbally provided to the user.

Further, when the user transmits a control command to the VXML server, the control command is transmitted to the vehicle sensor board through the vehicle information terminal, and the vehicle sensor board returns the command control execution and result. Passing through the vehicle information terminal and VXML server, the result can be verbally provided.

Further, when the emergency occurs in the vehicle, SMS transmission function is performed. For example, when car intrusion is detected, the vehicle sensor board performs corresponding SMS transmission through the vehicle information terminal and the VXML server. Therefore, the user can be informed of the emergency.

Further, in the case of the interface between the human and the car using the WIPI, for example, the user checks and controls the vehicle status using a cellular phone. The user is connected to the WIPI server, and the WIPI server interfaces with the vehicle information terminal. The vehicle sensor board returns the current status, and the current status is displayed on the user's cellular phone, passing the vehicle information terminal and the WIPI server.

Further, in the case of control command, the user is connected to the WIPI server, and the WIPI server interfaces with the vehicle information terminal. The vehicle sensor board returns the command control execution and result, and the current status is displayed on the user's cellular phone, passing the vehicle information terminal and the WIPI server.

Although the preferred embodiments of the present invention have been disclosed for illustrative purposes, those skilled in the art will appreciate that various modifications additions and substitutions are possible, without departing from the scope and spirit of the invention as disclosed in the accompanying claims.

According to embodiments of the present invention, unlike call connection service, an agent who picks tip the phone for remote control of the vehicle is not required. Further, like the vehicle remote control system using the mobile terminal, while the additional device for receiving and transmitting predetermined data is not attached to the cellular phone, the user calls the car to exchange information relating to the vehicle. If an emergency occurs to the vehicle, the vehicle informs first the user of the emergency, in which the user can remotely control the vehicle.

What is claimed is:

1. A system, comprising:
a vehicle information terminal in communication with a vehicle;
a vehicle sensor board that receives vehicle information from sensors of the vehicle and communicates the vehicle information with the vehicle information terminal;
a VXML server that converts the vehicle information into voice signals, and receives and transmits the voice signals between the vehicle information terminal and a telephone;
an SMS server that converts the vehicle information into a message, and transmits the message to the telephone; and
a WIPI server that receives and transmits vehicle remote control information between the telephone and the vehicle information terminal.

2. The system as defined in claim 1, further comprising a DB server that stores and manages the information and user authentication information.

3. The system as defined in claim 1, wherein said vehicle information terminal performs two way communication with the VXML server, the SMS server, and the WIPI server through the internet.

4. The system as defined in claim 1, wherein said VXML server provides a vehicle-related information checking function, a vehicle remote control function, an agent contact function, or a combination thereof.

5. The system as defined in claim 1, wherein said WIPI server provides a vehicle information providing function, a vehicle remote control function, an agent contact function or a combination thereof.

* * * * *